(12) United States Patent
Ohkita et al.

(10) Patent No.: US 7,997,395 B2
(45) Date of Patent: Aug. 16, 2011

(54) STRUT SUSPENSION

(75) Inventors: Tsuyoshi Ohkita, Susono (JP); Masato Fujiyama, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1139 days.

(21) Appl. No.: 11/551,851

(22) Filed: Oct. 23, 2006

(65) Prior Publication Data

US 2007/0170684 A1 Jul. 26, 2007

(30) Foreign Application Priority Data

Dec. 1, 2005 (JP) ................................. 2005-348170

(51) Int. Cl.
*F16F 9/38* (2006.01)
(52) U.S. Cl. ............................ 188/322.22; 280/124.147
(58) Field of Classification Search .................. 267/267; 280/124.146, 124.147, 124.154; 188/322.22, 188/322.12
See application file for complete search history.

(56) References Cited

U.S. PATENT DOCUMENTS

| | | | | |
|---|---|---|---|---|
| 4,274,655 A | * | 6/1981 | Lederman | 280/124.155 |
| 4,552,467 A | * | 11/1985 | Takei et al. | 384/615 |
| 4,778,198 A | * | 10/1988 | Gold | 280/124.147 |
| 5,074,579 A | * | 12/1991 | Evangelisti | 280/124.155 |
| 5,454,585 A | | 10/1995 | Dronen et al. | |
| 5,467,971 A | | 11/1995 | Hurtubise et al. | |
| 5,678,808 A | * | 10/1997 | Claude et al. | 267/64.15 |
| 5,947,459 A | * | 9/1999 | Ducloux et al. | 267/221 |
| 6,736,381 B2 | * | 5/2004 | Chesne | 267/220 |
| 6,923,461 B2 | * | 8/2005 | Momose et al. | 280/124.155 |
| 2004/0168870 A1 | * | 9/2004 | Handke et al. | 188/321.11 |
| 2004/0245691 A1 | * | 12/2004 | Handke et al. | 267/292 |

FOREIGN PATENT DOCUMENTS

| | | |
|---|---|---|
| JP | 9-220918 | 8/1997 |
| JP | 2002-31180 | 1/2002 |
| JP | 2002-283820 | 10/2002 |
| JP | 2003-118343 | 4/2003 |
| JP | 2003-326932 | 11/2003 |
| WO | WO 02/40299 | 5/2002 |

* cited by examiner

*Primary Examiner* — Robert Siconolfi
*Assistant Examiner* — Stephen Bowes
(74) *Attorney, Agent, or Firm* — Oblon, Spivak, McClelland, Maier & Neustadt, L.L.P.

(57) ABSTRACT

A strut suspension includes a shock absorber, and a bearing portion that connects the shock absorber to a vehicle body such that the shock absorber can rotate. The bearing portion includes an inner race and an outer race. The thickness of the inner race increases toward the outside of the vehicle body in a vehicle-width direction. The thickness of the outer race decreases toward the outside of the vehicle body in the vehicle-width direction. As a result, a rotational axis of the bearing portion tilts outward in the vehicle-width direction, with respect to an absorber-axis of the shock absorber. Also, the rotational axis tilts inward in the vehicle-width direction with respect to a kingpin axis.

2 Claims, 10 Drawing Sheets

STRUT SUSPENSION

INCORPORATION BY REFERENCE

The disclosure of Japanese Patent Application No. 2005-348170 filed on Dec. 1, 2005 including the specification, drawings and abstract is incorporated herein by reference in its entirety.

BACKGROUND OF THE INVENTION

1. Field of the Invention

The invention relates to a strut suspension.

2. Description of the Related Art

Strut suspensions for vehicles are composed of a small number of components, and are lightweight. Therefore, the strut suspensions are widely used. In the strut suspensions, a strut includes a shock absorber. The upper end of the piston rod of the shock absorber is connected to a vehicle body via an upper support. The lower end of the outer tube of the shock absorber is fixed to a hub carrier. Also, a coil spring is provided around the shock absorber, and the upper end of the coil spring is connected to the vehicle body via an upper spring seat and a bearing. A virtual line that connects the upper portion of the shock absorber to the ball joint of a lower arm fitted to the hub carrier is referred to as "kingpin axis". The strut and a vehicle wheel are steered around the kingpin axis.

PCT application international publication No. WO2002-040299 describes a strut suspension in which a lower bracket is provided between a bearing and a vehicle. The inner portion of the lower bracket in a vehicle-width direction protrudes downward with respect to the outer portion in the vehicle-width direction. As a result, the rotational axis of the bearing matches the kingpin axis. This suppresses generation of the steering moment around the kingpin axis (i.e., the moment that rotates the strut).

In another conventional structure, the absorber-axis of the shock absorber matches the rotational axis of the bearing. In this structure, the steering moment around the kingpin axis is in a permissible range defined to satisfy the performance requirement, only when the reaction-force line of the coil spring, which varies due to a manufacturing process, is in a narrow variation range. That is, the performance of the suspension is adversely influenced by the variations in the coil spring due to manufacturing variance (i.e., the suspension behavior is influenced by the variations in the coil spring). Therefore, a steering moment tends to be generated around the kingpin axis due to the variations in the reaction-force line of the coil spring. That is, the stability of the vehicle tends to deteriorate. Accordingly, it is desirable to reduce the influence that the variations in the coil spring due to manufacturing variance have on the suspension.

Meanwhile, in the case where the rotational axis of the bearing matches the kingpin axis as in the strut suspension described in the aforementioned publication, the friction around the kingpin axis is extremely low, and therefore the steering moment around the kingpin axis is substantially zero. However, the steering feeling may deteriorate.

SUMMARY OF THE INVENTION

The invention provides a strut suspension that reduces the influence that the variations in a coil spring due to manufacturing variance have on the suspension, and suppresses deterioration in steering feeling.

A first aspect of the invention relates to a strut suspension. The strut suspension includes a shock absorber, a coil spring, and a bearing portion. The shock absorber constitutes a strut. The coil spring is provided around the shock absorber. The bearing portion connects the shock absorber to the vehicle body such that the shock absorber can rotate. In the strut suspension, the absorber-axis of the shock absorber differs from the rotational axis of the bearing portion. Also, the angle between the absorber-axis and the rotational axis of the bearing portion in a vehicle-width direction is smaller than the angle between the absorber-axis and the kingpin axis in the vehicle-width direction.

In the aforementioned strut suspension, the absorber-axis of the shock absorber that constitutes the strut differs from the rotational axis of the bearing portion. Also, the rotational axis is positioned between the absorber-axis and the kingpin axis in the vehicle-width direction. Therefore, the friction around the kingpin axis is reduced, as compared to the case where the rotational axis matches the absorber-axis. This suppresses the generation of the steering moment around the kingpin axis due to the variations in the reaction-force line of the coil spring due to manufacturing variance. Accordingly, it is possible to reduce the influence that the variations in the coil spring due to manufacturing variance have on the suspension. Also, the friction around the kingpin axis increases as compared to the case where the rotational axis matches the kingpin axis. This suppresses deterioration in steering feeling. Thus, in the aforementioned strut suspension, by positioning the rotational axis between the absorber-axis and the kingpin axis, the friction around the kingpin axis may be appropriately adjusted. Accordingly, it is possible to reduce the influence that the variations in the coil spring due to manufacturing variance have on the suspension, and to suppress deterioration in the steering feeling.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
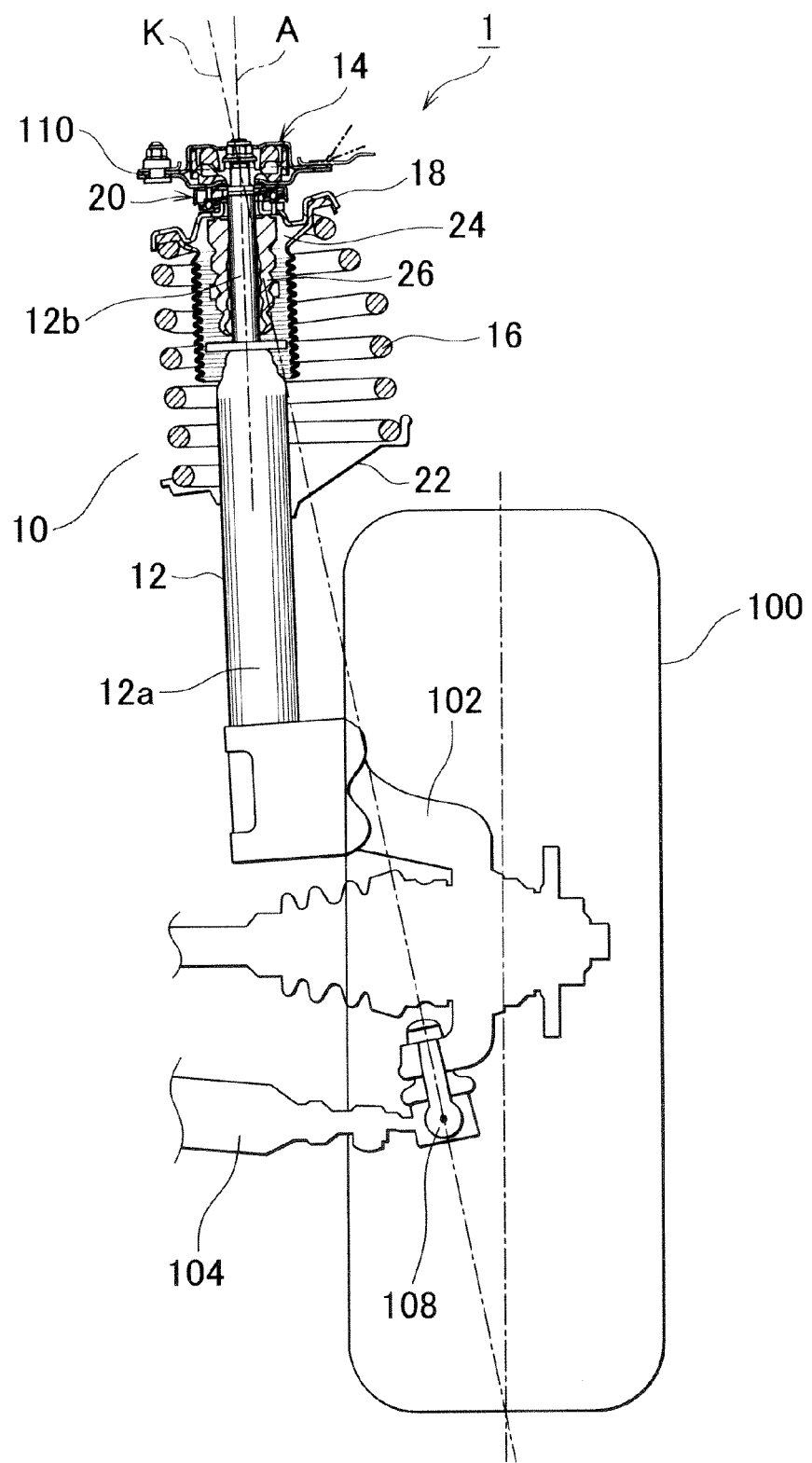
FIG. 1 is a cross sectional view showing the schematic configuration of a strut suspension according to a first embodiment of the invention.

Hereinafter, embodiments of the invention will be described in detail with reference to the accompanying drawings. For the sake of clarity, the same components are denoted by the same reference numerals in all the drawings, and redundant description will be omitted.

Figure 2:
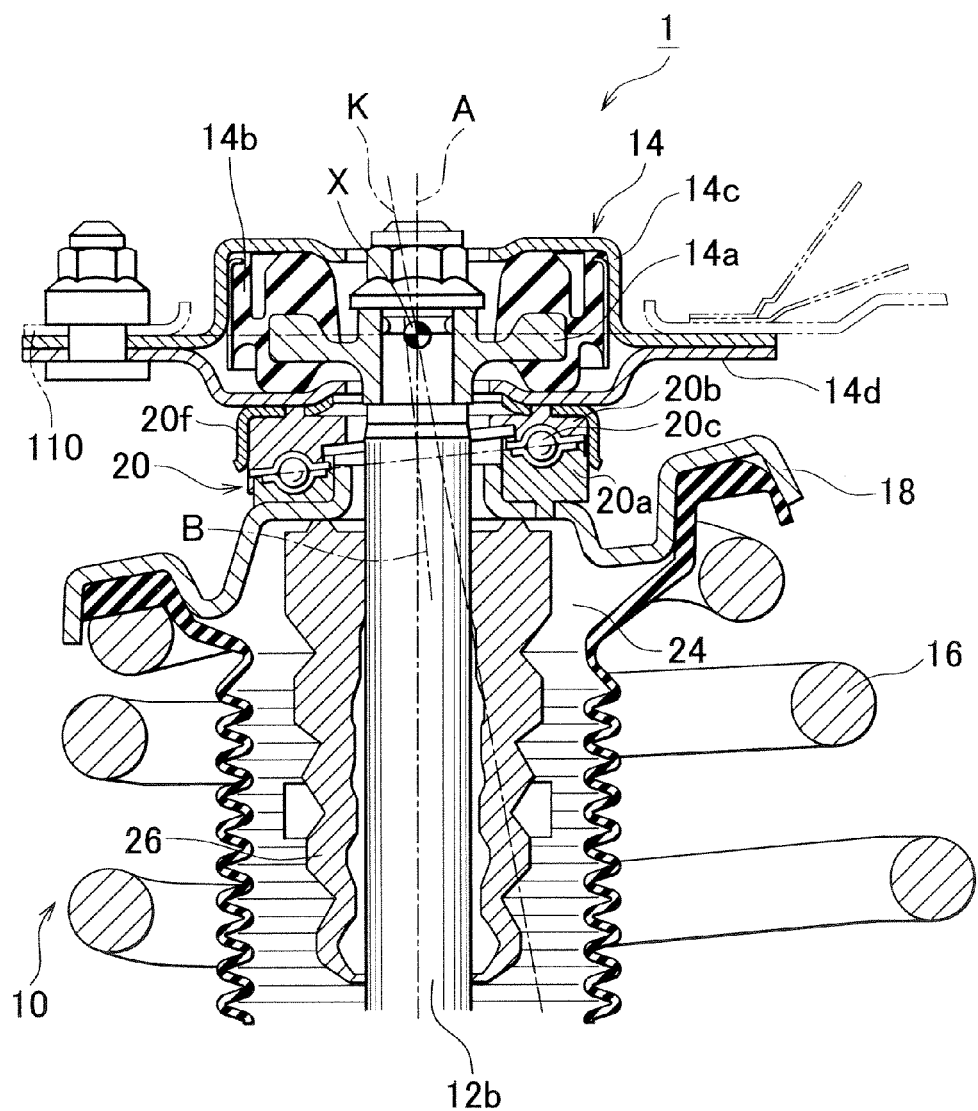
FIG. 2 is a cross sectional view showing the main portion of the strut suspension according to the first embodiment of the invention.
Figure 3:
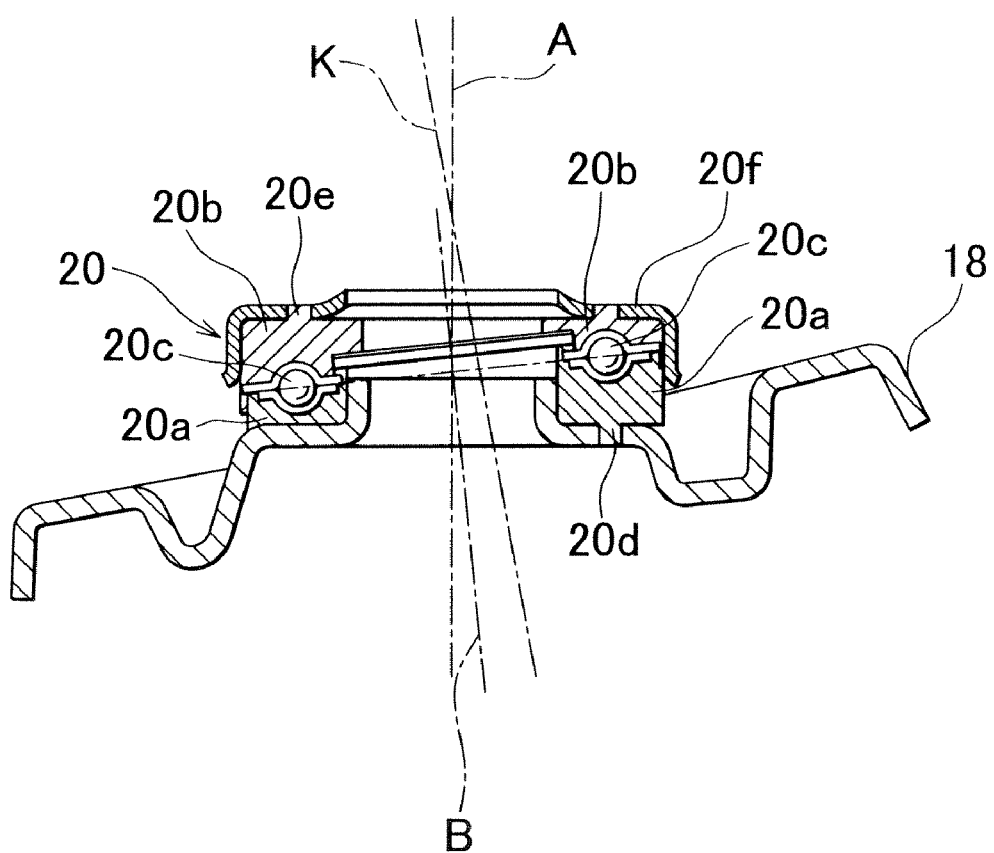
FIG. 3 is an enlarged cross sectional view showing the bearing portion of the strut suspension according to the first embodiment of the invention.

First, the configuration of a strut suspension 1 according to a first embodiment of the invention will be described with reference to FIG. 1 to FIG. 3. FIG. 1 is a cross sectional view showing the schematic configuration of the strut suspension 1. FIG. 2 is a cross sectional view showing the main portion of the strut suspension 1. FIG. 3 is an enlarged cross sectional view of a bearing portion 20 of the strut suspension 1. A vehicle wheel 100 is a front steering wheel.

The vehicle wheel 100 is fitted to a hub carrier 102 that is supported by a vehicle body 110 via a strut 10 and a lower arm 104. The hub carrier 102 is connected to the lower arm 104 by a ball joint 108. The rod of a steering mechanism (not shown) is fitted to the hub carrier 102. The movement of a steering wheel operated by a driver is transmitted to the hub carrier 102 via the rod. As a result, the vehicle wheel 100 is steered.

The strut 10 includes a shock absorber 12. The shock absorber 12 includes an outer tube 12a, and a piston rod 12b that protrudes upward from the upper end of the outer tube 12a. The lower end of the outer tube 12a is connected to the hub carrier 102. The upper end of the piston rod 12b is connected to the vehicle body 110 via an upper support 14.

As shown in FIG. 2, the upper support 14 includes a disc 14a, a bushing 14b, an upper plate 14c, and a lower plate 14d. The disc 14a is fitted to the periphery of the upper end of the piston rod 12b. The disc 14a is sandwiched between the upper portion and the lower portion of the bushing 14b made of rubber. The bushing 14b is provided between the upper plate 14c and the lower plate 14d. The upper plate 14c and the lower plate 14d are fixed to the vehicle body 110. The axis that connects the upper end of the piston rod 12b (point X in FIG. 2) to the ball joint 108 is referred to as "kingpin axis K". The kingpin axis "K" tilts outward in the vehicle-width direction, with respect to the axis "A" of the shock absorber 12 (hereinafter, referred to as "absorber-axis A"). The vehicle wheel 100 is steered around the kingpin axis "K".

A coil spring 16 is provided around the shock absorber 12. The upper end of the coil spring 16 is connected to the vehicle body 110 via an upper spring seat 18 and the bearing portion 20. As a result, the coil spring 16 rotates integrally with the upper spring seat 18. A lower spring seat 22 holds the lower end of the coil spring 16. The lower spring seat 22 is fixed to the periphery of the outer tube 12a. Thus, in the strut suspension 1, the upper end of the piston rod 12b is independent of the upper end of the coil spring 16. Accordingly, the reaction force from a road surface is input to the vehicle body 110 from the upper portion of the strut 10 via the shock absorber 12, and via the coil spring 16. The bearing portion 20 allows the strut 10 to smoothly rotate when the vehicle wheel is steered. The bearing portion 20 also suppresses the twist between the upper and lower ends of the coil spring 16 when the coil spring 16 stretches and shrinks.

An upper insulator 24 made of rubber is provided between the upper end of the coil spring 16 and the upper spring seat 18. The upper insulator 24 is integrated with a bellows. A bump stop 26 is provided around the upper end of the piston rod 12b of the shock absorber 12.

Next, the bearing portion 20 will be described in detail. The bearing portion 20, provided between the upper support 14 and the upper spring seat 18, supports the strut 10 such that the strut 10 can rotate. The bearing portion 20 is a thrust ball bearing. The bearing portion 20 includes a ring-shaped inner race 20a, a ring-shaped outer race 20b, and a plurality of balls (rolling bodies) 20c. The plurality of balls are provided in a bearing ring formed by the inner race 20a and the outer race 20b.

As shown in FIG. 3, a protrusion 20d (first stopper) is formed on the bottom of the inner race 20a. The protrusion 20d is fitted into a hole formed in the upper spring seat 18 so that the inner race 20a is connected to the upper spring seat 18. As a result, the inner race 20a rotates integrally with the upper spring seat 18. A protrusion 20e (second stopper) is formed on the top of the outer race 20b. The protrusion 20e is fitted into a bearing upper support 20f so that the outer race 20b is connected to the bearing upper support 20f. As a result, the outer race 20b is secured to the upper support 14 via the bearing upper support 20f. The balls 20c are held in the bearing ring formed by the inner race 20a and the outer race 20b such that the balls 20c can be rolled. The strut 10 is supported by the rolling movement of the balls 20c. The bearing upper support 20f is secured to the upper support 14 to prevent the bearing upper support 20f from rotating with respect to the upper support 14. For example, the bearing upper support 20f may be welded to the upper support 14.

As shown in FIG. 3, the thickness of each of the inner race 20a and the outer race 20b in the direction of the absorber-axis "A" varies along a vehicle-width direction (i.e., vehicle-width direction in FIG. 3). More specifically, the thickness of the inner race 20a increases toward the outside of the vehicle body (i.e., the right side in FIG. 3) in the vehicle-width direction. As a result, the rotational axis "B" of the bearing portion 20 tilts outward in the vehicle-width direction, with respect to the absorber-axis "A" of the shock absorber 12. Also, the rotational axis "B" tilts inward in the vehicle-width direction, with respect to the kingpin axis "K". The thickness of the outer race 20b decreases toward the outside of the vehicle body in the vehicle-width direction. The bottom of the inner race 20a and the top of the outer race 20b are orthogonal to the absorber-axis "A".

That is, in the strut suspension 1, the absorber-axis "A" of the shock absorber 12 differs from the rotational axis "B" of the bearing portion 20. Further an angle between the absorber-axis "A" and the rotational axis "B" in the vehicle-width direction is smaller than an angle between the absorber-axis "A" and the kingpin axis "K" in the vehicle-width direction.

Figure 4:
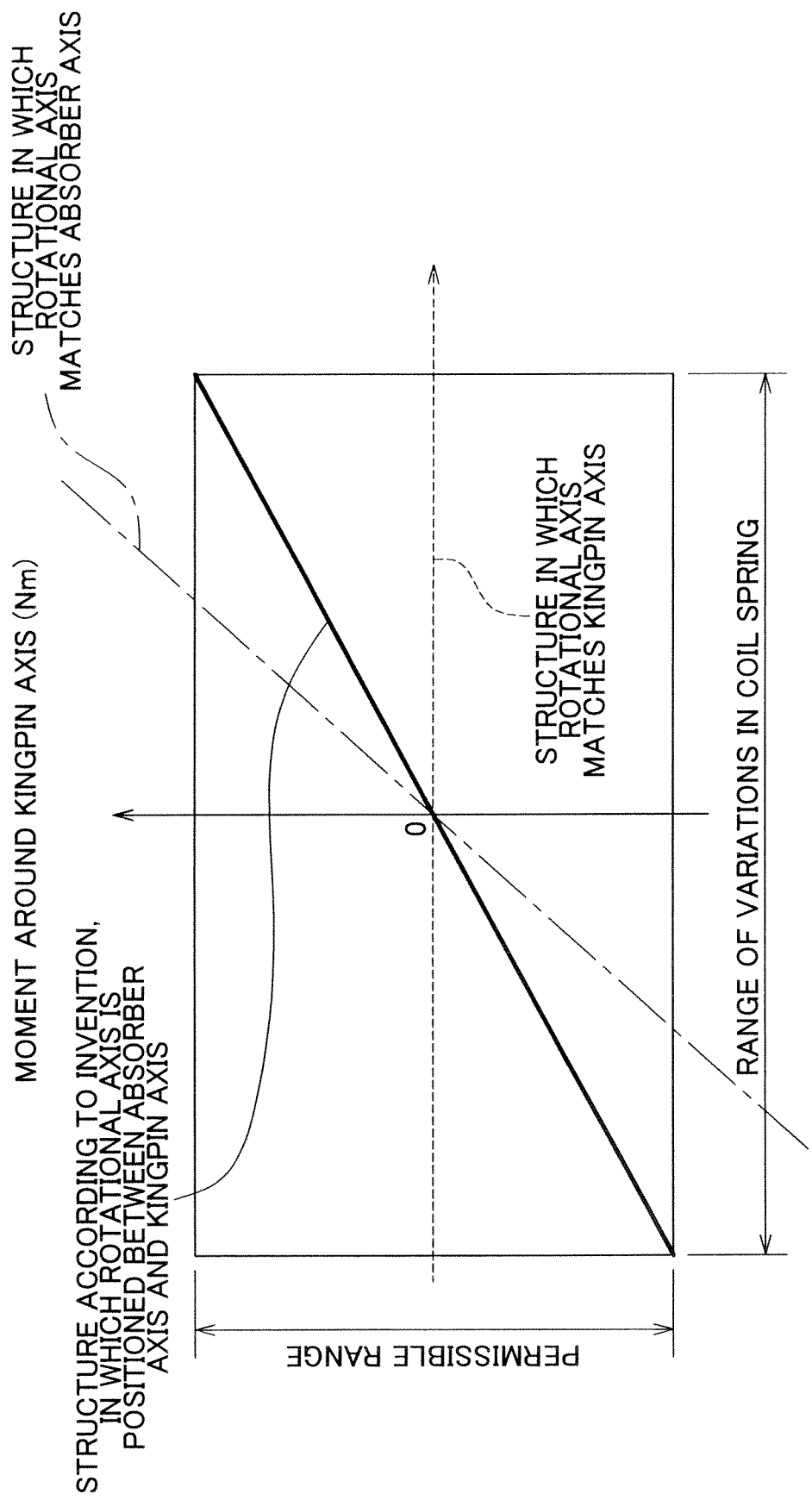
FIG. 4 is a graph showing the relation among the variations in a coil spring, a steering moment around a kingpin axis, and arrangement of an absorber-axis, the rotational axis of a bearing, and the kingpin axis.
Figure 5:
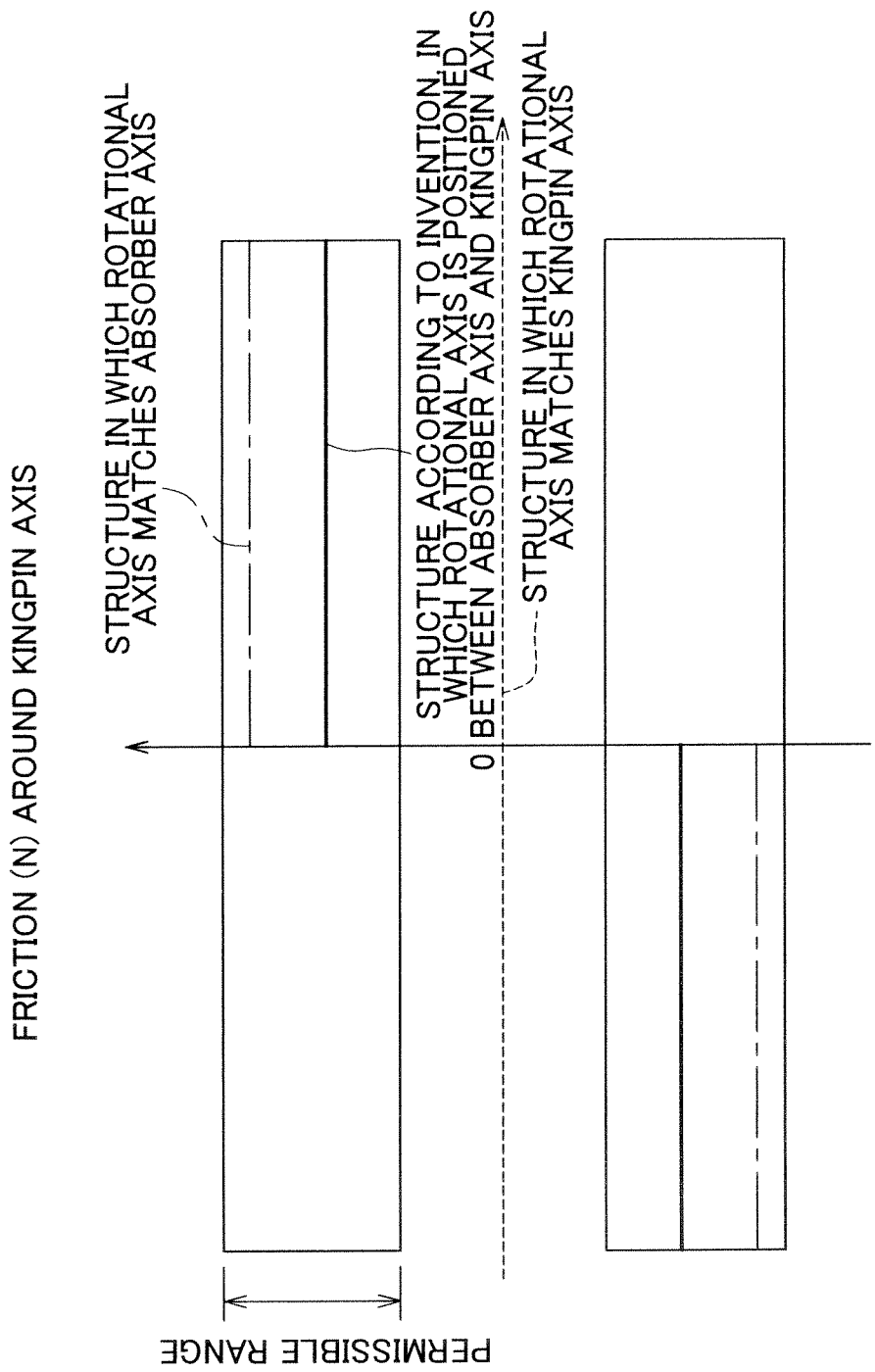
FIG. 5 is a graph showing the relation between the friction around the kingpin axis and the arrangement of the absorber-axis, the rotational axis of the bearing, and the kingpin axis.

Next, the characteristic of the strut suspension 1 will be described with reference to FIG. 4 and FIG. 5. FIG. 4 shows the relation among i) the variations in the reaction force-line of the coil spring due to manufacturing variance, ii) a steering moment around the kingpin axis "K", and iii) arrangement of the absorber-axis "A", the rotational axis "B". and the kingpin axis "K". In FIG. 4, the horizontal axis indicates the range of variations in the reaction force line of the coil spring. The vertical axis indicates the steering moment (Nm) around the kingpin axis "K". FIG. 5 shows the relation between i) the arrangement of the absorber-axis "A", the rotational axis "B", and the kingpin axis "K", and ii) a friction (N) around the kingpin axis "K".

First, the structure in which the rotational axis "B" of the bearing portion 20 matches the absorber-axis "A" of the shock absorber 12 will be described. As shown in FIG. 5, in the structure in which the rotational axis "B" matches the absorber-axis "A", the friction around the kingpin axis "K" (shown by a chain line) is greater than the friction in both the structure according to the embodiment, in which the rotational axis "B" is positioned between the absorber-axis "A" and the kingpin axis "K", and in the structure in which the rotational axis "B" matches the kingpin axis "K" (shown, respectively, by a solid line and a dashed line). However, the friction around the kingpin axis "K" is in a permissible range (for example, 0.5 N to 2.0 N) that is defined to satisfy the performance requirement. Meanwhile, as shown by a chain line in FIG. 4, only when the reaction-force line of the coil spring is in a narrow variation range, the steering moment around the kingpin axis "K" is in a permissible range (for example, 0 Nm to 20 Nm) that is defined to satisfy the performance requirement. Accordingly, the performance of the suspension is adversely influenced by the variations in the reaction-force line of the coil spring due to manufacturing variance. Accordingly, when the reaction-force line of the coil spring greatly deviates from a reference value, the steering moment is not in the permissible range.

Next, the structure in which the rotational axis "B" matches the kingpin axis "K" will be described. In this structure, the steering moment around the kingpin axis "K" is substantially zero, as shown by a dashed line in FIG. 4. Accordingly, the performance of the suspension is not adversely influenced by the variations in the reaction-force line of the coil spring due to manufacturing variance. In this structure, however, the friction around the kingpin axis "K" is also substantially zero, and is not in the permissible range, as shown by the dashed line in FIG. 5. As a result, the steering feeling deteriorates.

Next, the structure according to the embodiment will be described. In the structure according to the embodiment, the rotational axis "B" differs from the absorber-axis "A", and the rotational axis "B" is positioned between the absorber-axis "A" and the kingpin axis "K" in the vehicle-width direction. In this structure, the rotational axis "B" is close to the kingpin axis "K", as compared to the structure in which the rotational axis "B" matches the absorber-axis "A". This increases the variation range of the coil spring in which the steering moment around the kingpin axis "K" is in the permissible range, as shown by the solid line in FIG. 4. Accordingly, it is possible to reduce the influence that the variations in the coil spring due to manufacturing variance have on the suspension.

Also, in this structure according to the embodiment, the friction is generated around the kingpin axis "K" in accordance with the deviation of the rotational axis "B" from the kingpin axis "K". Therefore, the friction around the kingpin axis increases, as compared to the structure in which the rotational axis "B" matches the kingpin axis "K". As a result, the friction around the kingpin axis "K" is in the permissible range, as shown by the solid line in FIG. 5.

The angle between the rotational axis "B" and the kingpin axis "K" (or the angle between the rotational axis "B" and the absorber-axis "A") is set so that the steering moment around the kingpin axis "K" and the friction around the kingpin axis "K" are in the respective permissible ranges. More specifically, the angle between the rotational axis "B" and the kingpin axis "K" is set to be in the range of 2 to 8 degrees, more preferably, in the range of 4 to 7 degrees. In this embodiment, the angle between the rotational axis "B" and the kingpin axis "K" is set to 5 degrees.

According to the embodiment, the rotational axis "B" is close to the kingpin axis "K", as compared to the structure in which the rotational axis "B" matches the absorber-axis "A". This increases the variation range of the coil spring in which the steering moment around the kingpin axis "K" is in the permissible range. Accordingly, it is possible to reduce the influence that the variations in the coil spring due to manufacturing variance have on the suspension. Also, the friction is generated around the kingpin axis "K" in accordance with the deviation of the rotational axis "B" from the kingpin axis "K". Therefore, the friction around the kingpin axis increases, as compared to the structure in which the rotational axis "B" matches the kingpin axis "K". As a result, the friction around the kingpin axis is in the permissible range. Thus, according to the embodiment, by positioning the rotational axis "B" between the absorber-axis "A" and the kingpin axis "K", the friction around the kingpin axis "K" is appropriately adjusted. This reduces the influence that the variations in the coil spring due to manufacturing variance have on the suspension, and prevents deterioration in the steering feeling. Also, by appropriately adjusting the friction around the kingpin axis "K", it is possible to improve the stability of a steering system against stimuli from a road surface.

Also, according to the embodiment, the thrust ball bearing includes the inner race 20a and the outer race 20b, and the thickness of each of the inner race 20a and the outer race 20b in the direction of the absorber-axis "A" varies along the vehicle-width direction. Therefore, the rotational axis "B" of the bearing portion 20 can be appropriately tilted with respect to the absorber-axis "A".

Also, the thrust ball bearing includes the protrusion 20d formed on the lower surface of the inner race 20a, and the protrusion 20e formed on the top of the outer race 20b. Therefore, the rotational axis "B" can be easily positioned in the vehicle-width direction. Also, the bearing portion 20 can be prevented from rotating with respect to the upper spring seat 18 or the upper support 14.

Figure 6:
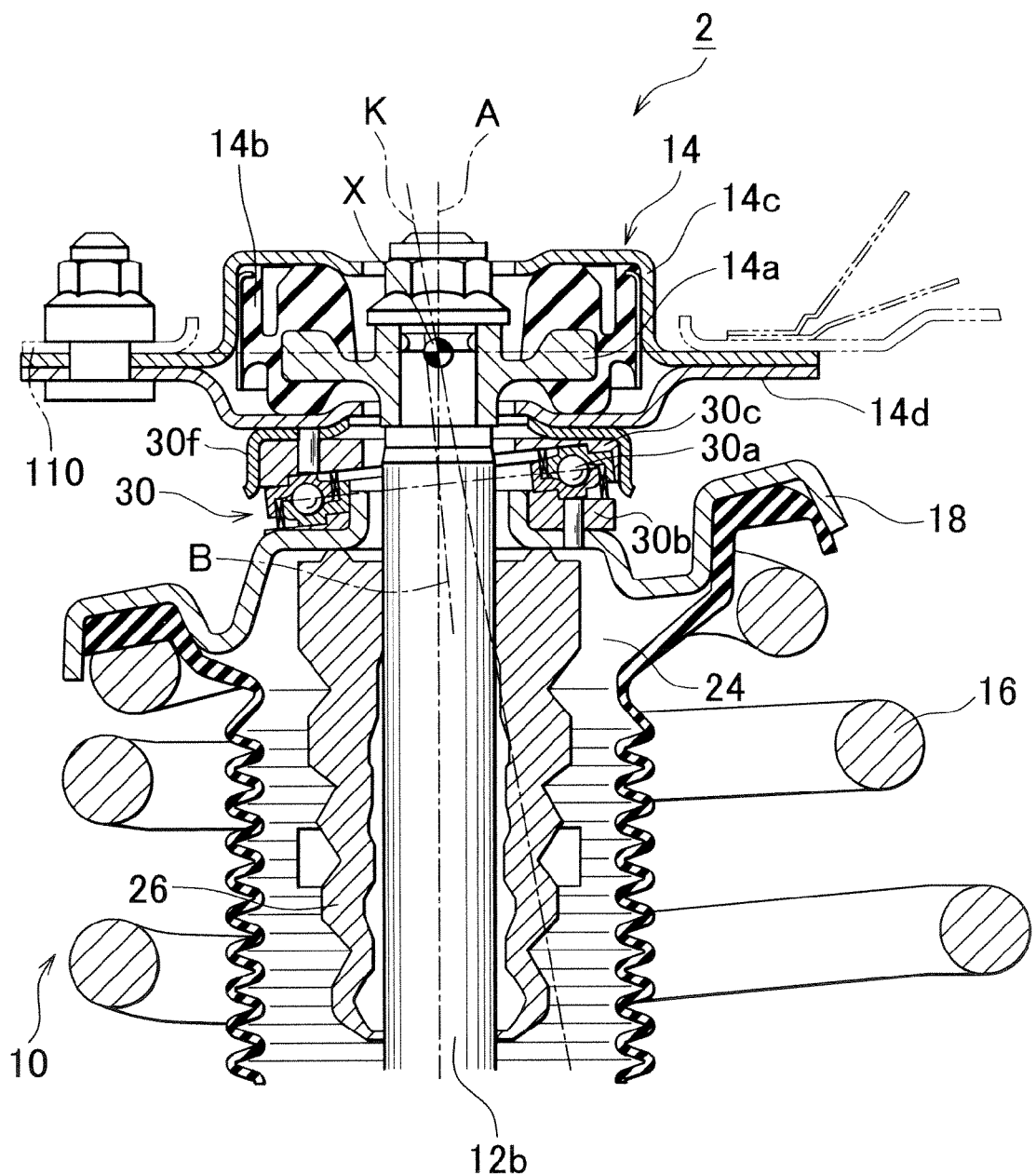
FIG. 6 is a cross sectional view showing the main portion of a strut suspension according to a second embodiment of the invention.
Figure 7:
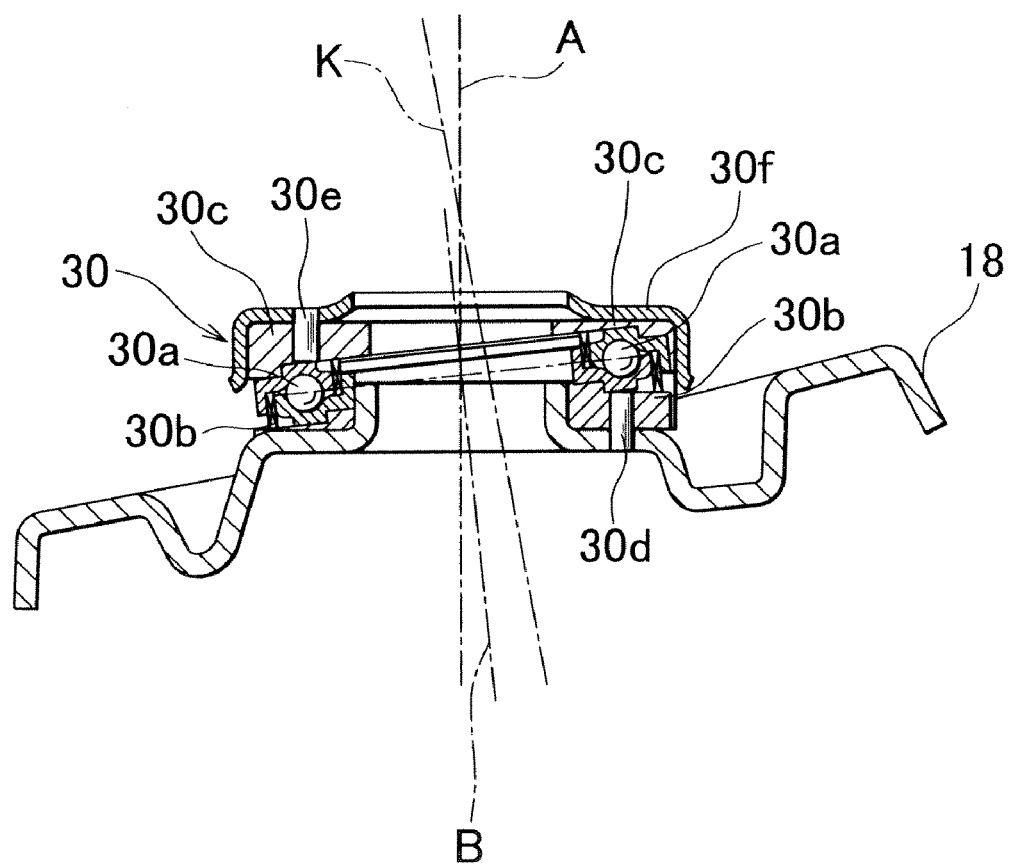
FIG. 7 is an enlarged cross sectional view showing the bearing portion of the strut suspension according to the second embodiment of the invention.

Hereinafter, the configuration of a strut suspension 2 according to a second embodiment will be described with reference to FIG. 6 and FIG. 7. FIG. 6 is a cross sectional view showing the main portion of the strut suspension 2. FIG. 7 is an enlarged cross sectional view showing the bearing portion 30 of the strut suspension 2. In FIG. 6 and FIG. 7, the same or corresponding components as in the first embodiment are denoted by the same reference numerals.

The configuration of the bearing portion 30 of the strut suspension 2 differs from that of the bearing portion 20 in the first embodiment. Because the configurations of other components are the same as in the first embodiment, description thereof will be omitted.

The bearing portion 30 includes a ring-shaped thrust ball bearing 30a, and ring-shaped spacers (hereinafter, referred to as "bearing seat shims") 30b, 30c that are provided on the top side and on the bottom side of the thrust ball bearing 30a. The thickness of each of the bearing seat shims 30b and 30c in the direction of the absorber-axis "A" varies along the vehicle-width direction (i.e., vehicle-width direction in FIG. 6). As the thrust ball bearing 30a, a conventional thrust ball bearing can be employed.

As shown in FIG. 7, the bearing seat shim 30b is provided on the bottom side of the thrust ball bearing 30a. The thickness of the bearing seat shim 30b increases toward the outside of the vehicle body (i.e., right side in FIG. 7) in the vehicle-width direction. As a result, the rotational axis "B" of the bearing portion 30 tilts outward in the vehicle-width direction, with respect to the absorber-axis "A" of the shock absorber 12. Also, the rotational axis "B" tilts inward in the vehicle-width direction, with respect to the kingpin axis "K". The bearing seat shim 30c is provided on the top side of the thrust ball bearing 30a. The thickness of the bearing seat shim 30c decreases toward the outside of the vehicle body in the vehicle-width direction. The bottom of the bearing seat shim 30b and the top of the bearing seat shim 30c are orthogonal to the absorber-axis "A".

That is because the bearing seat shims 30b and 30c are provided, the absorber-axis "A" of the shock absorber 12 differs from the rotational axis "B" of the bearing portion 20. Further. the angle between the absorber-axis "A" and the rotational axis "B" in the vehicle-width direction is smaller than the angle between the absorber-axis "A" and the kingpin axis "K" in the vehicle-width direction.

A spring pin (a third stopper) 30d is inserted in a hole formed in the bearing seat shim 30b and a hole formed in the upper spring seat 18. The bearing seat shim 30b is secured to the upper spring seat 18 at a predetermined position by the spring pin 30d. Thus, the bearing seat shim 30b rotates integrally with the upper spring seat 18. A spring pin 30e (a fourth stopper) is inserted in a hole formed in the bearing seat shim 30c and a hole formed in the bearing upper support 30f. The bearing seat shim 30c is secured to the upper support 14 via the bearing upper support 30f by the spring pin 30e.

Each of the cylindrical spring pins 30d and 30e has a C-shape cross-section. A notch that extends in the axial direction is formed in the cross section. When the spring pins 30d and 30e are inserted in the holes formed in the bearing seat shims 30b and 30c, respectively, the circumferences of the spring pins 30d and 30e shrink. Then, the circumferences of the spring pins 30d and 30e expand so that the spring pins 30d and 30e are pressed against the inner surfaces of the holes. This prevents the spring pins 30d and 30e from getting out of the holes. Instead of using the spring pins 30d and 30e, a protrusion may be formed in each of the bearing seat shims 30b and 30c. In this case, the protrusions formed in the bearing seat shims 30b and 30c are fitted into holes in the upper spring seat 18 and the bearing upper support 30f, respectively.

According to this embodiment, the bearing seat shim 30b is provided on the bottom side of the thrust ball bearing 30a, and the bearing seat shim 30c is provided on the top side of the thrust ball bearing 30a. The thickness of each of the bearing seat shims 30b and 30c in the direction of the absorber-axis "A" varies along the vehicle-width direction. This allows the rotational axis "B" of the bearing portion 30 to appropriately tilt with respect to the absorber-axis "A". Therefore, a conventional thrust ball bearing can be used.

Also, according to this embodiment, by providing the bearing seat shims 30b and 30c, the rotational axis "B" of the bearing portion 30 can be appropriately tilted. Therefore, the same effects as in the first embodiment can be obtained.

Figure 8:
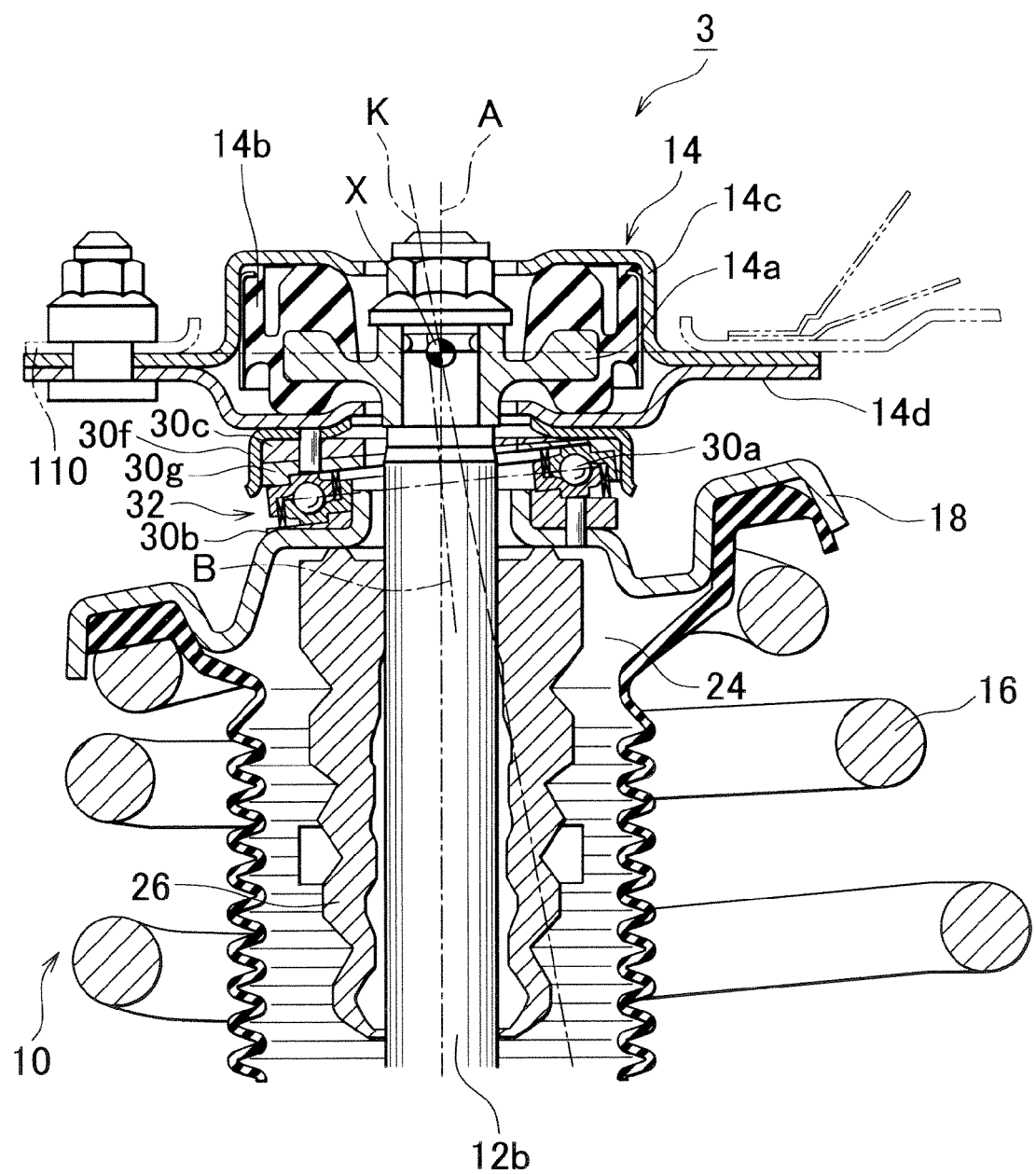
FIG. 8 is a cross sectional view showing the main portion of a strut suspension according to a third embodiment of the invention.

Next, the configuration of a strut suspension 3 according to a third embodiment of the invention will be described with reference to FIG. 8. FIG. 8 is a cross sectional view showing the main portion of the strut suspension 3. In FIG. 8, the same or corresponding components as in the second embodiment are denoted by the same reference numerals.

The configuration of the bearing portion 32 of the strut suspension 3 differs from that of the bearing portion 30 in the second embodiment. More specifically, unlike the second embodiment, a bearing seat shim 30g is provided between the ring-shaped thrust ball bearing 30a and the bearing seat shim 30c. Because other components have the same or similar configuration as in the second embodiment, description thereof will be omitted.

A ring-shaped spacer may be used as the bearing seat shim 30g. The thickness of the bearing seat shim 30g in the direction of the absorber-axis "A" varies along the vehicle-width direction (i.e., vehicle-width direction in FIG. 8). By providing the bearing seat shim 30g, the tilt angle of the rotational axis "B" of the bearing portion 32 can be delicately adjusted. A plurality of bearing seat shims 30g may be provided.

Figure 9:
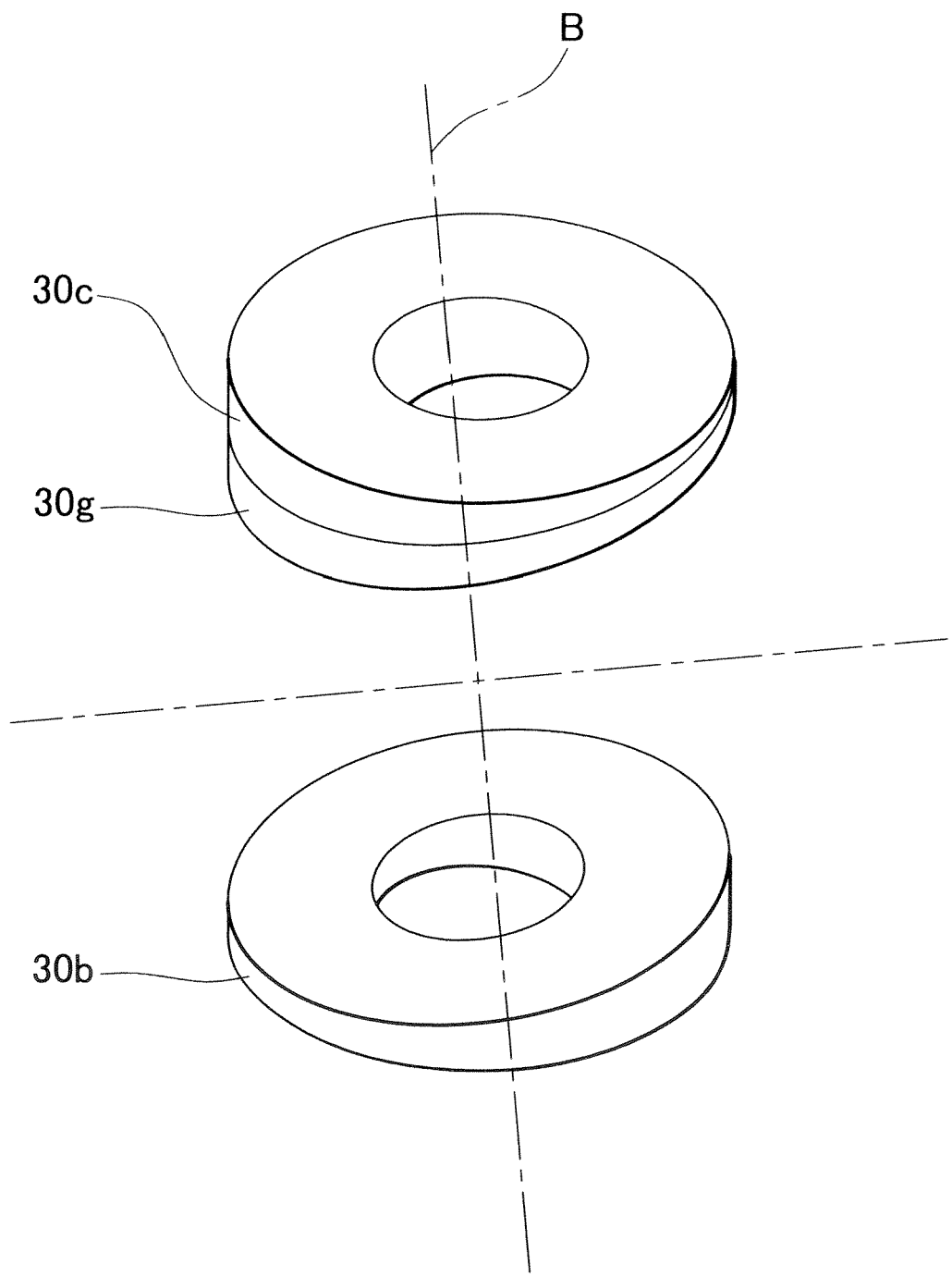
FIG. 9 is a graph showing the relation between the arrangement of bearing seat shims and the rotational axis of the bearing portion.
Figure 10:
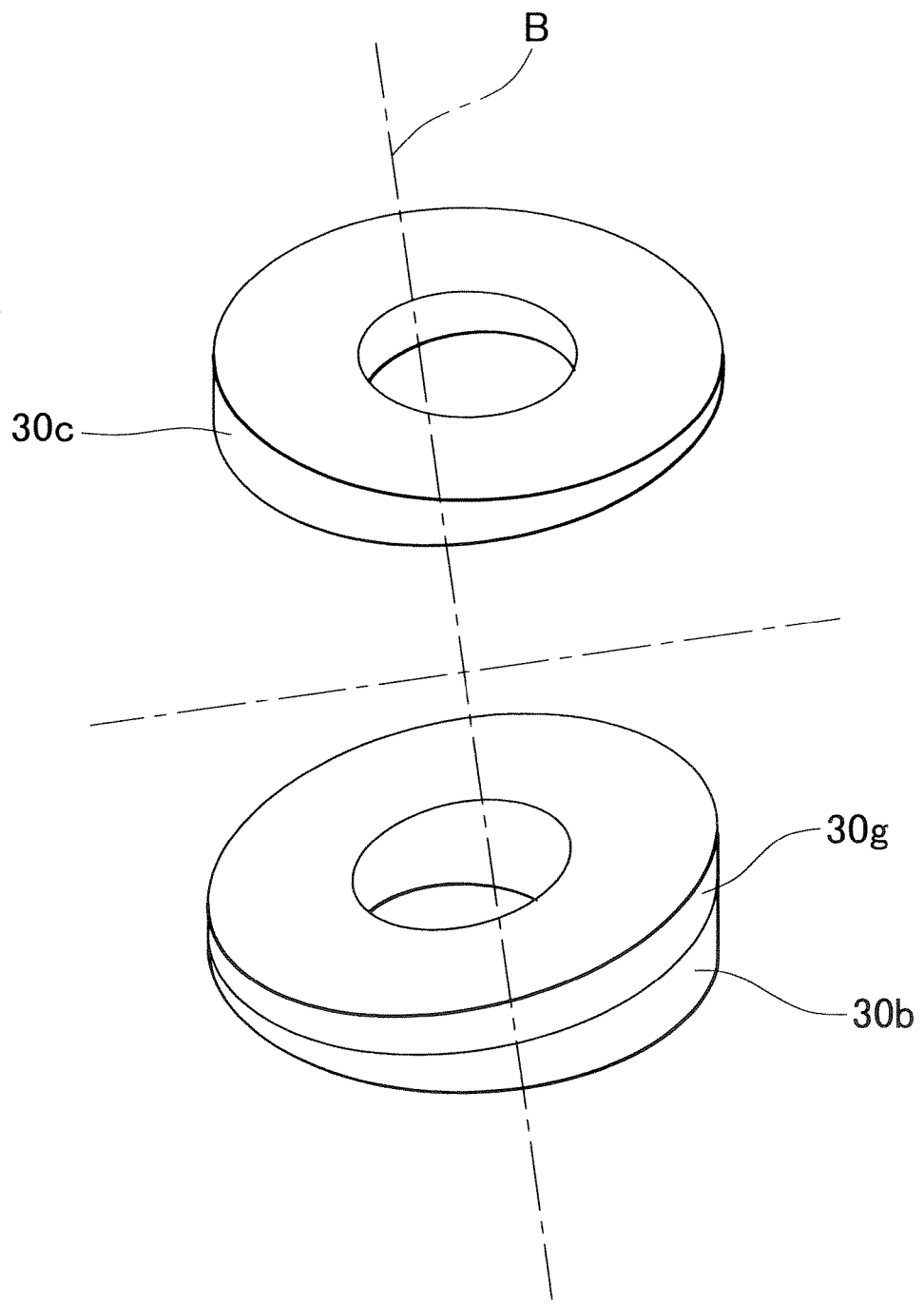
FIG. 10 is a graph showing the relation between the arrangement of bearing seat shims and the rotational axis of the bearing portion.

As shown in FIG. 10, the bearing seat shim 30g may be provided between the thrust ball bearing 30a and the bearing seat shim 30b. When the bearing seat shim 30g is provided between the thrust ball bearing 30a and the bearing seat shim 30b, the tilt angle of the rotational angel "B" of the bearing portion 32 can be easily changed, as compared to when the bearing seat shim 30g is provided between the thrust ball bearing 30a and the bearing seat shim 30c (refer to FIG. 9).

According to this embodiment, the tilt angle of the rotational axis "B" can be delicately and easily adjusted as described above. Therefore, even if the reaction-force line of the coil spring 16 deviates from an estimated variation range, or even when the specification of the coil spring 16 is changed, the tilt angle of the rotational axis "B" can be easily adjusted.

Also, according to this embodiment, by providing the bearing seat shims 30b, 30c, and 30g, the rotational axis "B" of the bearing portion 30 can be appropriately tilted. Therefore, the same effects as in the first embodiment or the second embodiment can be obtained.

Although the embodiments of the invention have been described, the invention is not limited to the aforementioned embodiments, and various modifications may be made to the embodiments. For example, although the strut suspension, in which the coil spring is fitted to the outside of the shock absorber, is employed in the aforementioned embodiments, the invention may be applied to an air suspension, a hydraulic suspension, or a strut suspension in which the stroke is controlled by, for example, a linear motor. Also, although the thrust ball bearing is employed in the bearing portion in each embodiment, other types of bearing may also be employed.

What is claimed is:

1. A strut suspension comprising:
a shock absorber that constitutes a strut;
a coil spring provided around the shock absorber; and
a bearing portion that connects the shock absorber to a vehicle body such that the shock absorber can rotate,
wherein an absorber-axis of the shock absorber differs from a rotational axis of the bearing portion; and an angle between the absorber-axis and the rotational axis in a vehicle-width direction is smaller than an angle between the absorber-axis and a kingpin axis in the vehicle-width direction,
wherein the bearing portion includes a bearing including an inner race and an outer race; and a thickness of each of the inner race and the outer race in a direction of the absorber-axis varies along the vehicle-width direction,
wherein the bearing portion is provided between an upper support and an upper spring seat; and the bearing portion includes a first stopper that prohibits the inner race from rotating with respect to the upper spring seat, and a second stopper that prohibits the outer race from rotating with respect to a bearing upper support that is secured to the upper support,
wherein the first stopper is formed on a bottom surface of the inner race and the first stopper fits in a first hole provided the upper spring seat,
wherein the second stopper is formed on a top surface of the outer race and the second stopper fits in a second hole provide in the upper support, and
wherein a bottom surface of the inner race and a top surface of the outer race are orthogonal to the absorber-axis.

2. A strut suspension comprising:

a shock absorber that constitutes a strut;

a coil spring provided around the shock absorber; and a bearing portion that connects the shock absorber to a vehicle body such that the shock absorber can rotate, wherein an absorber-axis of the shock absorber differs from a rotational axis of the bearing portion; and an angle between the absorber-axis and the rotational axis in a vehicle-width direction is smaller than an angle between the absorber-axis and a kingpin axis in the vehicle-width direction, wherein the angle between the kingpin axis and the rotational axis of the bearing portion is greater than 2 degrees, and the kingpin axis is an axis around which a vehicle wheel pivots.

* * * * *